US009390390B1

(12) United States Patent
Wertheimer

(10) Patent No.: US 9,390,390 B1
(45) Date of Patent: Jul. 12, 2016

(54) ALLOCATING COMPUTING RESOURCES BASED ON SERVICE-LEVEL REQUESTS

(71) Applicant: Google Inc., Mountain View, CA (US)

(72) Inventor: David L. Wertheimer, South San Francisco, CA (US)

(73) Assignee: Google Inc., Mountain View, CA (US)

( * ) Notice: Subject to any disclaimer, the term of this patent is extended or adjusted under 35 U.S.C. 154(b) by 249 days.

(21) Appl. No.: 14/057,651

(22) Filed: Oct. 18, 2013

(51) Int. Cl.
*G06Q 10/06* (2012.01)
*G06F 9/46* (2006.01)

(52) U.S. Cl.
CPC ................................. *G06Q 10/06313* (2013.01)

(58) Field of Classification Search
None
See application file for complete search history.

(56) References Cited

U.S. PATENT DOCUMENTS

| 5,640,569 | A * | 6/1997 | Miller | G06F 9/50 |
| | | | | 705/37 |
| 8,676,621 | B1 * | 3/2014 | Helfrich | G06Q 10/0631 |
| | | | | 705/37 |
| 2004/0111308 | A1 | 6/2004 | Yakov | |
| 2010/0076856 | A1 | 3/2010 | Mullins | |
| 2011/0131335 | A1 * | 6/2011 | Spaltro | G06F 9/5072 |
| | | | | 709/228 |
| 2013/0346227 | A1 * | 12/2013 | Jain | G06Q 30/08 |
| | | | | 705/26.3 |

OTHER PUBLICATIONS

Stokely et al., "Using a Market Economy to Provision Compute Resources Across Planet-wide Clusters" Proceedings for the International Parallel and Distributed Processing Symposium 2009, IEEE, pp. 1-8.

* cited by examiner

*Primary Examiner* — Eric C Wai
(74) *Attorney, Agent, or Firm* — Fish & Richardson P.C.

(57) ABSTRACT

Methods, systems, and apparatus, including computer programs encoded on a computer storage medium, for allocating resources. In one aspect, a method includes identifying a first set of computing resources used to provide the first computing service. A first resource level bid is determined for each particular computing resource of the set of computing resources. A competing request statement can be identified based on the competing request statement's second computing service requiring a proper subset of the first set of computing resources. The second computing service can be at a different level within a request hierarchy than the first computing service. A second resource level bid can be determined for each computing resource of the proper subset of resources using a competing bid for the second computing service. A determination can be made that allocation of the first set of computing resources to the first resource requester meets an allocation objective.

33 Claims, 5 Drawing Sheets

ALLOCATING COMPUTING RESOURCES BASED ON SERVICE-LEVEL REQUESTS

BACKGROUND

Cloud computing and other distributed computing systems allow resource providers to offer computing services (e.g., software as a service) and resources (e.g., raw data storage) for use by others over a network. For example, a resource provider may host a web-based application for a business, and enable use of the web-based application over the Internet. Some companies have organizational distributed computing systems in which employees or departments may be able to request and use computing resources of the distributed computing system.

SUMMARY

In general, one innovative aspect of the subject matter described in this specification can be embodied in methods that include the actions of receiving, from a first resource requester, a first request statement that specifies a first computing service and a service bid specifying a value that the first resource requester is willing to pay for the first computing service; identifying a first set of computing resources that will be used to provide the first computing service; determining, for each particular computing resource of the set of computing resources, a first resource level bid value; identifying a competing request statement that specifies a second computing service and a competing bid specifying a value that a resource requester that submitted the competing request statement is willing to pay for the second computing service, the competing request statement being identified based on the competing request statement's second computing service requiring a proper subset of the first set of computing resources, the second computing service being at a different level within a request hierarchy than the first computing service; determining, for the competing request statement, a second resource level bid value for each computing resource of the proper subset of resources using the competing bid; identifying a resource allocation objective for allocation of the first set of computing resources among the resource requesters; determining that allocation of the first set of computing resources to the first resource requester meets the allocation objective based, at least in part, on the first resource level bid value for each computing resource of the proper subset of computing resources and each second resource level bid value for each computing resource of the proper subset of computing resources; and in response to determining that allocation of the first set of computing resources to the first resource requester meets the allocation objective, providing data that causes the first set of computing resources to be allocated for use by the first resource requester. Other embodiments of this aspect include corresponding systems, apparatus, and computer programs, configured to perform the actions of the methods, encoded on computer storage devices.

These and other embodiments can each optionally include one or more of the following features. The competing request statement can include a resource level request statement that specifies a particular computing resource in the set of computing resources and a competing bid for the particular resource.

Aspects can further include generating, for each particular computing resource of the set of computing resources, a condition statement that conditions the first resource level bid value for the particular computing resource on a bid for another computing resource of the set of computing resources.

Identifying the set of competing request statements can include receiving the competing request statement specifying the second computing service; identifying a second set of computing resources for use in providing the second computing service using a supply translation function for the second computing service, the second supply translation function specifying one or more resources required to implement the second computing service; and determining that a computing resource of the second set of computing resources matches a computing resource of the first set computing resources.

The first request statement can specify a quantity of the first computing service. The first supply translation function can specify a quantity of each of the one or more computing resources used to provide an instance of the first computing service. A quantity of each of the one or more computing resources is determined for the first request statement based on the quantity of the first computing service specified by the first request statement and the quantity of the computing resource used to provide an instance of the first computing service. Identifying the set of computing resources for use in implementing the first computing service can include identifying, for each of the one or more computing resources, a set of available resources that correspond to the computing resource. The set of available resources can include at least the required quantity of the computing resource.

Aspects can further include determining a bid value for each resource of the set of resources based on the service bid for the first computing service and the first supply translation function. Determining that allocation of the first set of computing resources to the first resource requester meets the allocation can include inputting the request statements into a mixed integer programming problem that allocates the resources to resource requesters based on the resource allocation objective and the request statements.

The resource allocation objective can include one of maximizing revenue from the bid values, minimizing a number of rejected request statements, or maximizing a number of resources allocated. Identifying a first set of computing resources that will be used to provide the first computing service can include identifying the first set of computing resources based on a first supply translation function specifying one or more computing resources that are used to provide the first computing service. The one or more resources specified by the first supply translation function can be raw computing resources required to implement the first computing service. Determining a first resource level bid value for a particular computing resource can include determining the first resource level bid based on the service bid and a first pricing function that converts the service bid to the resource level bid.

Particular embodiments of the subject matter described in this specification can be implemented so as to realize one or more of the following advantages. Resources can be allocated to users that request different levels of computing services (e.g., different combinations of computing resources that have relationships such as hierarchical or bills-of-material-like consumption relationships) and computing resources in a manner that facilitates efficient and effective use of the computing resources. Requesting users can submit bids for computing services at various levels as specified by the users. A resource allocation system can convert requests for different levels of computing services into bids for raw computing resources that are combined to provide the service. The resource allocation system can also allocate the resources based on the bids for the raw computing resources to meet a resource allocation objective.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
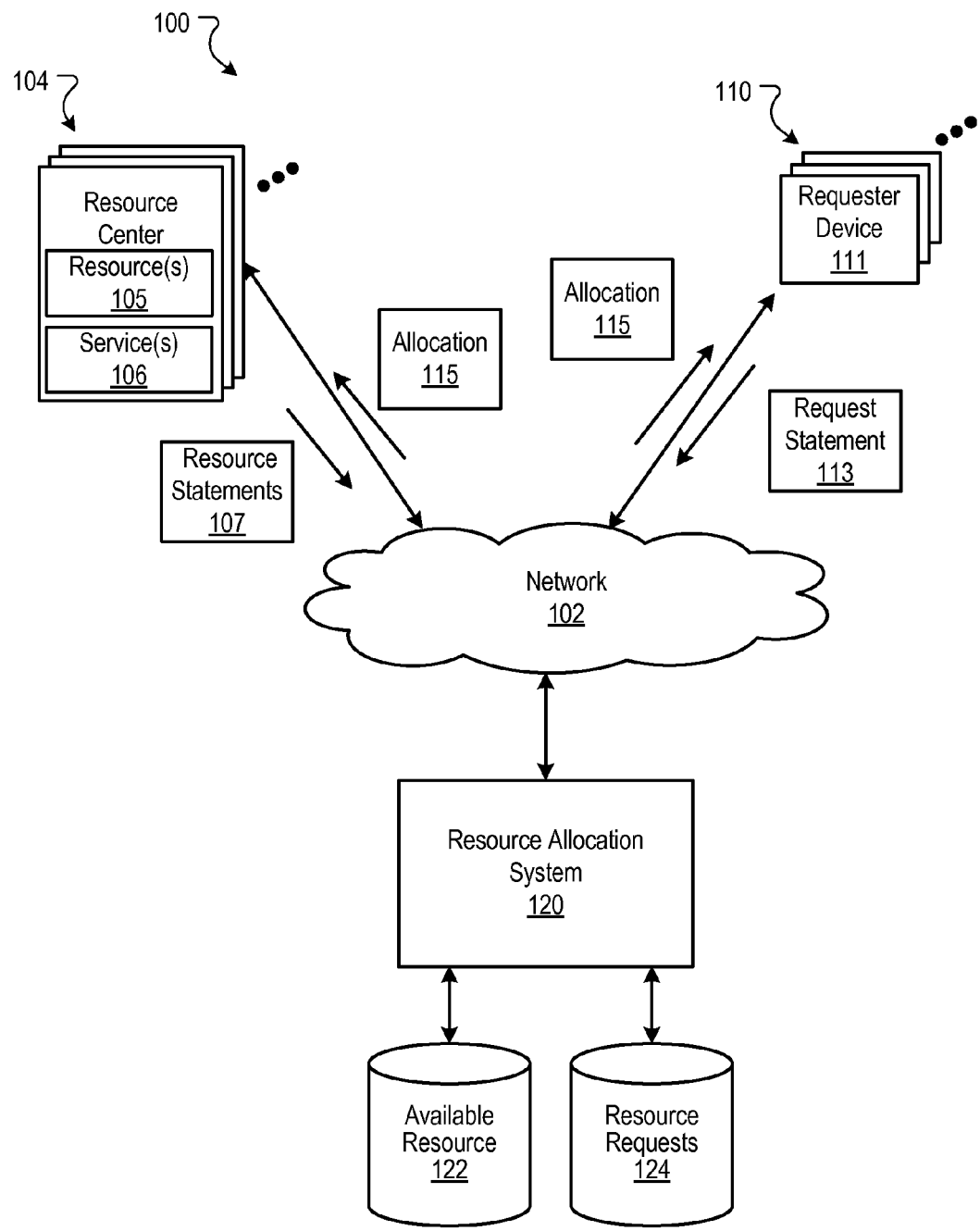
FIG. 1 is a block diagram of an example environment in which a resource allocation system allocates resources.

A system allocates computing resources based on requests for computing services that utilize combinations of the computing resources. Each computing service may be provided using a particular combination of underlying resources and/or services. For example, a software application may be provided over the Internet using a particular number (or a range) of processor cores having at least a minimum level of performance, a particular amount of data storage, and a particular amount of networking resources. Another software application may be provided using a different combination of the computing resources.

A computing service may also be provided using an intermediate level service and/or other raw computing resources. For example, a software application may use a back-up service in addition to a set of processor cores. The back-up service may also use computing resources, such as data storage units, processor cores, and/or networking resources.

Similarly, computing resources made available by a resource provider, such as a cloud computing provider, have different features, capabilities and capacities. These computing resources can be packaged in many different ways to provide different feature sets to different requesting users. For example, raw data storage on a single server can be packaged by way of software components running on multiple servers across multiple geographies, and with high speed networking between the servers, into a storage solution that can survive the destruction of a data center. The same raw data may be packaged simply as back-up data storage for a different user.

The system can determine how to allocate the underlying computing resources based on the requests for the computing services and a resource allocation objective, e.g., to maximize the amount of revenue obtained by providing the computing resources. In some implementations, the system identifies underlying computing resources for each computing service requested, for example using a supply translation function for the computing service. The supply translation function can specify one or more computing services (e.g., data backup service) and/or computing resources (e.g., raw computing resources, such as processor cores, data storage, networking resources, and/or memory) that can be used to provide the computing service. The system can also determine a bid value for each of the underlying services and resources based on a bid value for the computing service, the supply translation function for the computing service, and optionally a pricing function, for example provided by the resource provider. For example, a pricing function may specify that a particular portion of a bid value for the computing service be allocated to each type of underlying service and resource.

As some of the resource requests may compete for the same underlying computing resources, the system can determine how to allocate the computing resources based on the bid values for the underlying resources, the resource allocation objective, and optionally other constraints, such as interdependencies between the underlying computing resources, budget constraints of those requesting resources, and pricing constraints of resource providers. In some implementations, the system generates a mixed integer programming problem based on the inputs and evaluates the problem to determine an allocation of the computing resources that meets the resource allocation objective.

FIG. 1 is a block diagram of an example environment 100 in which a resource allocation system 120 allocates resources. A data communication network 102, such as a local area network (LAN), wide area network (WAN), the Internet, or a combination thereof, connects resources 105 of resource providers 104, devices 111 of resource requesters 110, and a resource allocation system 120.

A resource provider 104 is an entity, such as an individual or organization, that provides computing resources 105 and/or computing services 106 for use over a network. For example, a resource provider 104 may be a cloud computing provider that provides the use of computing services and resources over the Internet. A resource provider 104 may also be an Information Technology ("IT") group (e.g., within a company or external IT provider) that makes computing service and resources available to individuals or groups within an organization by way of the network 102. A resource provider 104 may also be a third party broker that allocates computing services and resources from one or multiple cloud computing providers.

The resources 105 can include raw computing resources, machine-level resource, and other types of computing resources that are accessible over a network. For example, the resources 105 may include processor cores, memory, data storage, network devices, and/or software applications. The resources 105 can be provided in discrete units or in groups, e.g., a group of processors and memory. The resources 105 can also be distributed across multiple locations. For example, the resources 105 provided by a resource provider 104 may be distributed across multiple resource centers that are located in different parts of the world.

The computing services 106 can include software services, redundant data storage solutions, and other services that are deployed over the network 102. The computing services 106 can include services at various different levels in a hierarchical relationship. The hierarchy can be based on bill-of-materials-like consumption relationship between the services and underlying resources. For example, a raw computing resource that does not demand the use of another raw computing resource may be considered to be at the lowest level in the hierarchy. A computing service that uses other computing services and/or raw computing resources, but is not used by other computing services, may be considered to be at a highest level in the hierarchy. In addition, a computing service that can is used by other computing services, such as a data backup service that is used by an application, may be considered to be at an intermediate level in the hierarchy.

As an example of a hierarchical relationship, a particular number of processor cores and a particular amount of data storage may be used to provide computing service A while a greater number of processor cores (i.e., greater than the particular number) and a backup service that demands a greater amount of data storage (i.e., greater than the particular amount), a particular level of security, and a particular level of geographic redundancy, may be used to provide computing service B. These two example computing services may be at different levels in the hierarchy based on their differing amount of resources and/or based on computing service B utilizing sophisticated security and/or redundancy. For example, computing service A may be at a higher level in the hierarchy than computing service B as computing service A corresponds to more computing resources than computing service B. In addition, the backup service may be at a level in the hierarchy that is between the level for computing service A and the level for computing service B. Although the three services are on different levels within the hierarchy, the services may utilize the same type of underlying resources, such as the same type of processor cores and/or the same type of data storage.

As described in more detail below with reference to FIG. 2, a resource provider 104 can identify computing services and/or resources that the resource provider 104 is making available to others by submitting resource statements 107 to the resource allocation system 120. In general, a resource statement 107 includes data identifying available computing services or resources and various characteristics of the computing services or resources. The resource allocation system 120 can store data regarding available computing services and resources in an available resource data store 122.

Resource requesters 110, such as individuals and organizations, can request computing services and resources by providing request statements 113 to the resource allocation system 120. The request statements 113 may include data identifying one or more computing resources 105 and/or or more computing services 106 that the resource requester 110 is requesting to use. For example, a request statement 113 may identify a high level software application (e.g., a combination of processing cores and application memory) and/or a particular amount of raw data storage. As described in more detail below, a request statement 113 can also include other data regarding the requested computing resource and/or criteria for fulfilling the request. The resource allocation system 120 can store the resource requests 113 and/or data regarding the requested resources in a resource requests data store 124.

The resource allocation system 120 can allocate the available computing services and resources identified in the available resource data store 122 (or a portion of the available services and resources) based, at least in part, on the resource requests 113 and a resource allocation objective. Example resource allocation objectives include allocating the resources to maximize the revenue or profit generated by the allocation, to maximize the number of resources allocated, or to minimize the number of rejected request statements, and to minimize the amount of stranded resources. Resource allocation objectives can be stored in a data store, such as the resource requests data store 124.

The resource allocation system 120 can also provide resource allocation data 115 to the resource requesters 110 and/or to the resource providers 104. The resource allocation data 115 for a resource requester 110 may include data specifying computing services and/or resources the resource requester 110 was allocated and the winning bid for each of the allocated resources. Similarly, the resource allocation data 115 for a resource provider 104 may include data specifying which of its computing services and resources were allocated and to what requester the services and resources were allocated.

Figure 2:
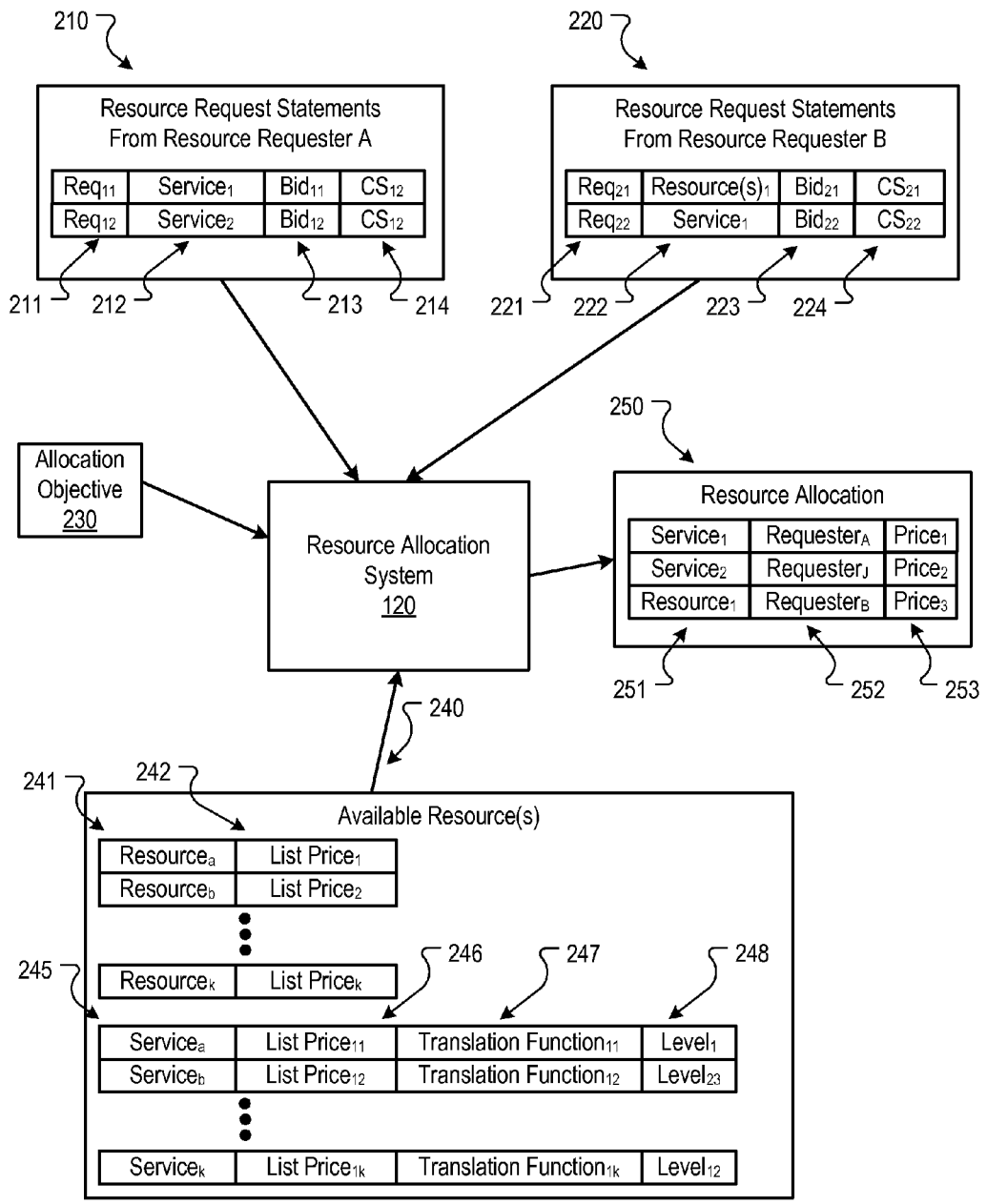
FIG. 2 is a block diagram illustrating example inputs to, and outputs of, an example resource allocation system.

FIG. 2 is a block diagram 200 illustrating example inputs to, and outputs of, an example resource allocation system 120. Example inputs to the resource allocation system 120 include request statements, such as a request statement 210 received from "Resource Requester A" and a request statement 220 received from "Resource Requester B." Each request statement includes a request for one or more computing resources 105 and/or one or more computing services 106. For example, the request statement 210 includes a request "$Req_{11}$" for a computing service and a request "$Req_{12}$" for another computing service. Similarly, the request statement 220 includes a request "$Req_{21}$" for one or more computing resources and a request "$Req_{22}$" for a computing service.

For each requested computing service 106, the request statement 210 includes a request identifier 211, data identifying the requested computing service 212 that is the subject of the request, a bid 213, and optionally one or more condition statements 214. Similarly, the request statement 220 includes, for each requested computing resource and computing service, a request identifier 221, data identifying the requested computing service or resource 222 that is the subject of the request, a bid 223, and optionally one or more condition statements 224.

The bid for a computing service or resource specifies a value that the resource requester is willing to pay to be allocated the computing service or resource. This value may be expressed in terms of dollars, credits, or a value above a list price or minimum bid value for use of the service or resource(s). For example, a resource requester may specify a particular dollar amount that the requester is willing to pay, or a dollar amount above a minimum price specified by the resource provider. For an IT department internal to an organization, a resource requester may bid in resource allocation units rather than dollars. For example, each individual or group within the organization may be allocated a particular number of resource allocation units in which they can use to bid for resources.

The condition statements can be used to express interdependencies between the request statements and their bids. For example, the request "$Req_1$" may include a condition statement "$CS_1$" that conditions its bid "$Bid_1$" on the bid "$Bid_2$" for request "$Req_2$" being sufficient to have the service "$Service_2$" allocated to the resource requester. By way of example, an organization may want to run an application using a particular computing service, but only if the organization can also acquire the use of another computing service or a data storage resource for storing data related to the application. The organization may use a condition statement to condition the bid for the particular computing service on being allocated the other service or the data storage, and vice versa. A condition statement can also be used to define a group of bids that all must win (e.g., result in allocation of the resources and/or services corresponding to the bids) for any of the resources and services to be allocated to a resource requester.

A condition statement can be used to condition a bid for a resource or service on a requester not being allocated another resource or service. For example, an organization may submit a bid for two different resources, even though the organization may want only one of two resources. If the organization is allocated one of the two resources, then the bid for the other resource can be considered canceled, ineligible, or void, so that the organization will not be allocated the second resource.

A condition statement can also be used to define a partial group of resources or services. For example, an organization may want two resources out of a group of ten available resources. If two of the resources are allocated to the requester, the requester's bid (e.g., bids for the other eight resources or a single bid that the requester has provided for any of the ten resources) may be canceled.

A condition statement can also be used to specify a range in the number of services or resources requested or in the number of groups of services or resources requested. For example, a resource requester may want to use between seven and ten distinct groups of data storage systems to provide a desired amount of redundancy. In this example, the bid for each group of data storage systems can be conditioned on the resource requester being allocated between seven and ten of the groups of data storage systems for which the resource requester submitted a request statement. Or, a single request statement may specify the ten groups of data storage systems and include a condition statement that specifies that the request statement is only valid if some amount between seven and ten of the data storage systems inclusive will be allocated to the resource requester.

The request statements can also include a total budget amount for the resource requester. This budget amount specifies a value to not be exceeded by the bids made by the resource requester.

A list of available computing services and resources may be provided to potential resource requesters 110 so that the resource requesters 110 can determine for which, if any, resources the requesters want to submit a bid. For example, the resource allocation system 120 can provide a user interface that specifies the available computing services and resources and their characteristics (e.g., speed, location, list price, etc.) prior to allocating the services and resources. The user interface can also specify a list or minimum price for each of the available resources. The resource requesters 110 can access the user interface, for example over the network 102, and submit request statements 113 for a computing service resource or a group of services and resources that are specified in the user interface.

Another input to the resource allocation system is data regarding available computing services and resources 240. As described above, the resource allocation system 120 can receive resource statements 107 that identify computing services and/or resources that resource providers 104 are willing to provide to resource requesters 110 and store this data in the available resource data store 122. The resource statements 107 include data identifying available computing resources or services, a time period for which the computing resources or services are available, a geographic location of the computing resources or services, performance characteristics of the computing resources or services, and/or a list price for the resources or services. The list price for a resource may be a minimum price at which the resource provider is willing to allow another to use the resource or service.

The data stored for each available computing resource 105 can include data identifying the resource 241 and the list price 242 for the resource if one has been provided. Although not shown, the data for a raw computing resource may also include other provided characteristics of the resource, such as performance or location data.

The data stored for each available computing service 106 can include data identifying the service 245, a list price 246 for the service, a supply translation function 247 for the service, and optionally data identifying a service level 248 for the service. The service level 248 for a computing service identifies the hierarchical level for the computing service. For example, a computing service that is provided using more underlying resources that consumes intermediate level services would be at a higher level in the hierarchy than a service that is provided using only raw computing resources.

The computing service 106 may be provided using available raw computing resources, such as the resources 105. For example, a computing service (e.g., "Service.") that uses a particular amount of data storage may be provided using data storage resources (e.g., "Resource$_a$") selected from the available resources 105.

A supply translation function for a computing service 106 specifies one or more underlying computing resources 105 and/or one or more underlying computing services that are used to provide the computing service. For example, a single instance of a computing service 106 may be provided using a number "M" of processor cores and a number "N" of gigabytes of memory. The supply translation function for such a computing service may specify that M processor cores and N gigabytes of memory should be allocated for each instance of the computing service. The resource provider 104 that provides the computing service may generate and provide the supply translation function based on the underlying demands of the computing service.

The supply translation function for a computing service may be a linear function, a piecewise linear function, or a nonlinear function. For example, the supply translation function for the previous processor and memory example may be as shown in linear relationships (1) and (2) below. In relationships (1) and (2), the parameter "y" represents the number of instances of the computing service.

$$\text{Processor Cores} = M*y \quad (1)$$

$$\text{Memory} = N*y \quad (2)$$

An underlying computing service (e.g., a computing service at an intermediate hierarchical level) that is used to provide another computing service may also have an associated supply translation function. For example, computer service A may use a set of processor cores and a data backup service to store a particular amount of data. The backup service may have a translation function that specifies that a certain amount of raw data storage is required for each requested gigabyte of data backup. The supply translation function may also specify other computing resources, such as processor cores and networking resources to transfer the data.

As described in more detail below, the resource allocation system 120 can use the supply translation function (and supply translation functions for any underlying computing services that are used by the computing service) and a requested quantity or capacity of a requested computing service 106 to determine what computing resources 105 and the amount of computing resources 105 that should be acquired in order to provide the computing service 106. The resource allocation system 120 can also identify suitable computing resources 105 from the set of available computing resources for the computing service 106.

The list price for a computing service 106 may be provided by the resource provider 104. A resource provider 104 can set the list price in several ways, or in a way that combines multiple ways together. In one example, a resource provider 104 that provides the computing service 106 and the underlying resource(s) 105 (e.g., an internal service provider) may set the list price based on the supply translation function (or a pricing function similar to the supply translation function) and a price for each underlying resource to recover the cost of providing the computing service 106. Continuing the previous example illustrated in relationships (1) and (2), the price for an instance of the computing service may be determined using relationship (3) below. In relationship (3), the parameter "CorePrice" represents the price for one processor core and the parameter "MemoryPrice" represents the price for one gigabyte of memory.

$$\text{List Price} = (M^*y^*\text{CorePrice}) + (N^*y^*\text{MemoryPrice}) \quad (3)$$

For a resource provider 104 wanting to make a fixed-volume-based markup might add a markup to the price determined using the supply translation function. Or, a resource provider 104 may markdown the price determined using the supply translation function to increase market penetration.

A resource provider 104 may set the list price as a minimum acceptable bid price. The minimum acceptable bid may be based on the supply translation function and prices for the underlying resources and/or other data. In some implementations, the resource provider 104 may not specify a list price, but instead set a minimum total price for all of the computing services and resources made available to the resource allocation system 120. This total price can be used as a constraint in the resource allocation process, as described in more detail below.

Another input to the resource allocation system 120 is a resource allocation objective 230. The resource allocation objective 230 specifies a parameter and a goal value for the parameter. The goal value can be, for example, an absolute value, such as an integer or another number, a relative value, such as a maximum value that can be achieved based on other inputs and constraints, or an objective function. For example, the goal value can be specified by specifying that the value of the parameter is to be maximized or minimized by the allocation of the resources. For example, the resource allocation objective may specify that the parameter of revenue is to be maximized, the parameter of the number of resources allocated is to be maximized, the parameter of the number of rejected request statements is to be minimized, or the parameter of the amount of stranded resources is to be minimized. For purposes of this document, a stranded resource is a resource that remains unallocated following allocation of the resources.

The resource allocation system 120 can allocate the available computing services and resources to the resource requesters based on the resource allocation objective, the bids of the resource requests, the supply translation functions for the computing services and/or the list prices for the computing services and resources. In some implementations, as described below, the resource allocation system 120 generates and evaluates a mixed integer programming problem using the inputs to allocate the computing services and resources to meet the resource allocation objective.

The resource allocation system 120 can provide, as an output, data specifying the resource allocation 250. This data 250 can include, for each allocated computing service or resource, data identifying the service or resource 251, data identifying a resource requester 252 that has been allocated the computing service or resource, and a price 253 to be paid for allocation of the computing service or resource.

Figure 3:
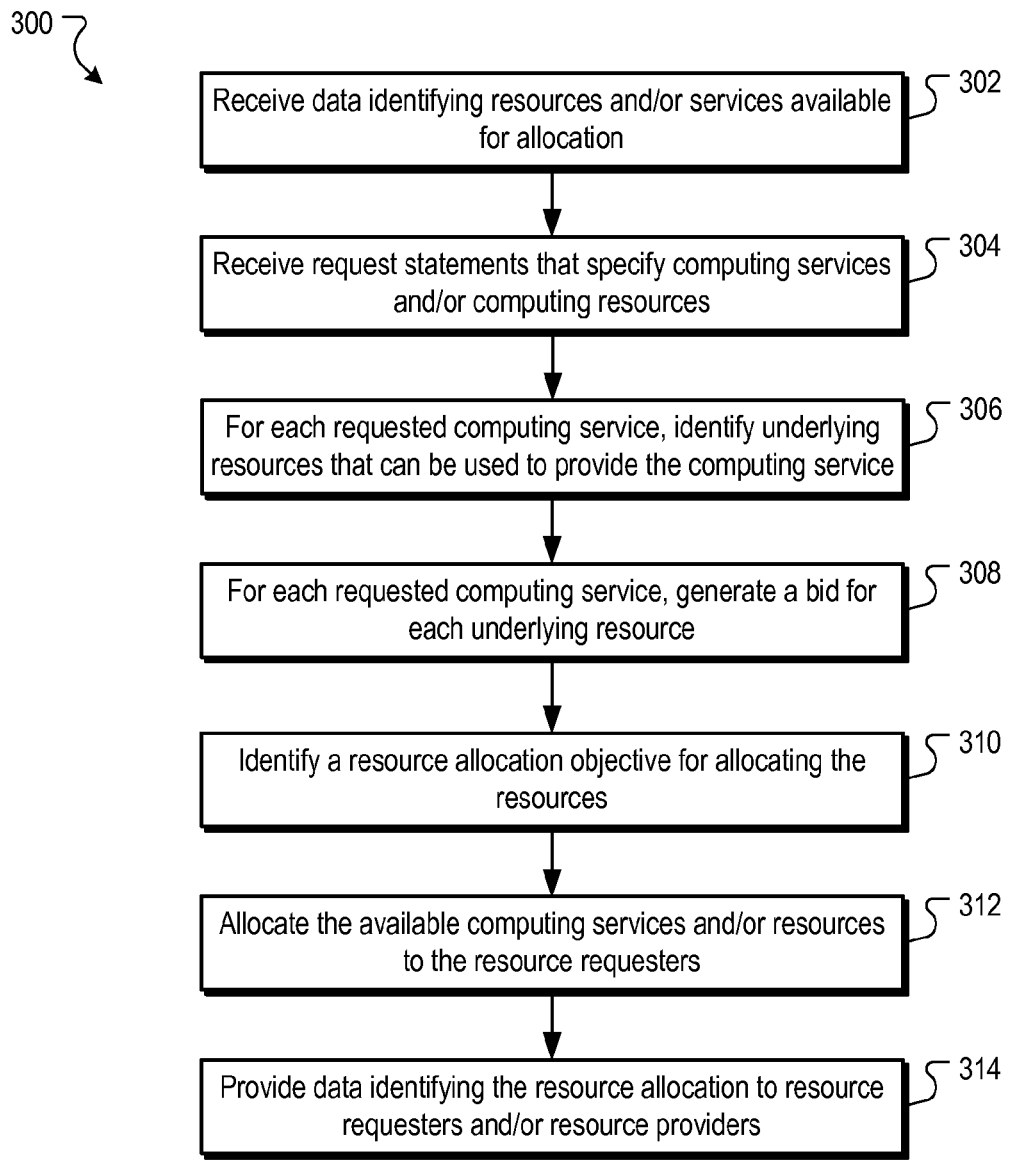
FIG. 3 is a flow chart of an example process for allocating resources.

FIG. 3 is a flow chart of an example process 300 for allocating computing services and resources. Operations of the process 300 can be implemented, for example, by a data processing apparatus, such as the resource allocation system 120 of FIG. 1. The process 300 can also be implemented by instructions stored on computer storage medium, where execution of the instructions by a data processing apparatus cause the data processing apparatus to perform the operations of the process 300.

Data identifying computing services and/or resources available for allocation are received (302). In some implementations, the data identifying the computing services and/or resources are received from resource providers 104. For example, resource providers 104 may provide, to a resource allocation system 120, resource statements 107 that each identifies a computing service, computing resource, or a group of computing services and/or resources that the resource provider 104 will make available to others. As described above, each resource statement 107 can identify the subject computing service or resource (e.g., the service or resource that will be made available), a list or minimum price that the resource provider 104 is willing to accept for use of the computing service or resource, a time period during which the computing service or resource will be made available, and/or a geographic location at which the computing service or resource is located. Other data regarding the computing service or resource can also be provided in the resource statements 107, such as data speed, bandwidth, manufacturer, compatibility with other resources, etc. The resource allocation system 120 can store the data identifying the available services and resources in the available resource data store 122 and use the data to allocate the computing services and resources.

Request statements 113 that each specifies a requested computing service, computing resource, or group of computing services and/or resources are received (304). In some implementations, the request statements 113 are received from one or more resource requesters. For example, resource requesters 110 may provide to the resource allocation system 120 request statements 113 that specify the requested computing services and/or resources and bids for the requested computing services and/or resources. As described above, a request statement 113 can specify a quantity or capacity of the computing service or resource desired (e.g., minimum and/or maximum), a condition statement specifying a condition on the bid, a time period during which the computing service or resource is desired, a geographic location for the desired computing service or resource, any budget constraints the resource requester 110 may have, and/or other data regarding the computing service or resource. The resource allocation system 120 can store the request statements in the resource requests data store 124 and use the data to allocate the available resources to the resource requesters 110.

For each requested computing service 106, the resource allocation system 120 identifies underlying raw computing resources and underlying computing services (and their underlying resources) that can be used to provide the computing service (306). The resource allocation system 120 can identify a supply translation function for each requested computing service and use the supply translation function to identify the types and amounts of underlying resources for the computing service. For underlying computing services, the resource allocation system 120 can also use supply translation functions for those computing services to identify the types and amounts of computing resources for the underlying services. The resource allocation system 120 can also identify available resources that match each type of underlying resource for the computing service, including those for the underlying services. For example, if a computing service demands twenty processor cores and two hundred gigabytes of memory, the resource allocation system 120 can attempt to identify at least twenty processors cores for which to bid and at least two hundred gigabytes of memory for which to bid. If the computing service also demands a backup service, the resource allocation system 120 can attempt to identify the resources demanded by the backup service.

For each requested computing service, the resource allocation system 120 can generate a resource bid for each identified underlying raw computing resource that can be used to provide the computing resource (308). Continuing the previous example, the resource allocation system 120 can generate a resource bid for each of the identified processor cores, each identified unit of memory, and for the backup service. The value of the resource bids can be based on the supply translation function, the bid value for the computing service, a pricing function provided by the resource provider, and data regarding the relative pricing of each of the underlying resources (e.g., a processor core may cost twice that of one gigabyte of memory). For example, the supply translation identifies the amount of each resource that should be acquired and can be used, along with a relative price between the resources, to determine how to allocate the bid value amongst the resources.

The resource allocation system 120 can also generate a resource bid for each resource demanded by the backup service. The value of these resource bids can be based on the resource bid for the backup service, a supply translation function for the backup service, a pricing function provided by the backup service provider, and data regarding the relative pricing of each of the underlying resources. For example, the backup service provider may provide a pricing function that specifies how a bid for the underlying service is to be allocated to constituent underlying resources.

A pricing function can specify how bid values for a computing service are to be distributed amongst the underlying resources. For example, a pricing function may specify that half of the bid value be allocated to processor cores and half of the bid value be allocated to memory, or some other distribution.

The resource allocation system 120 can distribute the bid value for the computing service to the underlying resources such that the bid value for the computing service is not exceeded and the resource bids for the underlying resources match or is similar to the relative pricing of the resources. For example, assume that a computing service demands one processor core and one gigabyte of memory and a processor core typically costs twice that of one gigabyte of memory. A bid value of three dollars for the computing service may be distributed as two dollars for the processor core and one dollar for the memory.

As more than the specified amount of underlying resources may be allocated for the computing service and/or the resource bids may not win some or all of the resources, the resource allocation system 120 can generate condition statements for the resource bids. Consider the previous example of the computing service that demands twenty processor cores and two hundred gigabytes of memory. The resource allocation system 120 may identify two sets of twenty processor cores and generate a resource bid for each set. To prevent both sets of processor cores from being allocated for the computing service, the resource allocation system 120 can generate a condition statement for the resource bid for each set of processor cores that specifies that the resource bid is not valid if the other set of processor cores is allocated for the computing service. The resource allocation system 120 can also generate a condition statement for each resource bid for the processor cores that specifies that the resource bid is only valid if two hundred gigabytes of memory is also allocated for the computing service. Other types of condition statements described above, such as those that define groups of resources, can also be generated for the resource bids.

A resource allocation objective for allocation of the computing services and resources is identified (310). An operator, system designer, or other entity associated with the resource allocation system 120 can specify a resource allocation objective for the available computing services and resources, for example, based on business goals or considerations. In some instances, the operator's business goal may be to maximize revenue or profit. In such instances, the operator may utilize an objective function specifying that the available computing services and resources are to be allocated such that revenue or profit is maximized. In other instances, the operator's business goal may be to fulfill as many requests as possible independent of whether such a business goal will result in maximized revenues or profits. In such instances, the operator may identify an objective function specifying that the available resources are to be allocated in a manner that minimizes the number of request statements 113 that are rejected, or that ensures fewer than a threshold number (or portion) of the requests statements 113 are rejected. In some implementations, the operator can identify an objective function by selecting from available objective functions presented through a user interface provided by the resource allocation system 120.

The available computing services and resources are allocated to the resource requesters 110 based on the resource allocation objective, the resource requests, and the underlying resources for the requested computing services (312). In some implementations, the resource allocation system 120 generates a mixed integer programming problem based on resource allocation objective, the request statements, and data regarding the available computing services and resources. The resource allocation system 120 can evaluate the mixed integer programming problem to determine a resource allocation that achieves the allocation objective while meeting the constraints specified by the resource statements and the request statements. An example process for generating and evaluating a mixed integer programming problem is illustrated in FIG. 4 and described below.

Data identifying the resource allocation are provided to the resource requesters 110 and/or the resource providers 104 (314). The resource allocation system 120 may provide to each resource provider 104 data identifying which of its computing services and/or resources have been allocated, the winning bid for each allocated computing service or resource, and the requester to whom each computing service or resource has been allocated. Similarly, the resource allocation system 120 may provide to each resource requester 110 data identifying which computing services and/or resources have been allocated to the requester, the winning bid price for the computing service or resource, and which resource provider 104 will provide the computing service or resource to the resource requester.

Data can also be provided that causes computing resources and .or computing services that have been allocated to a resource requester to be allocated for use by the resource requester. For example, the data may be provided to an apparatus (e.g., an apparatus that is part of, or separate from, the resource allocation system 120) that allows access to the allocated computing resources and/or services based on the data.

Figure 4:
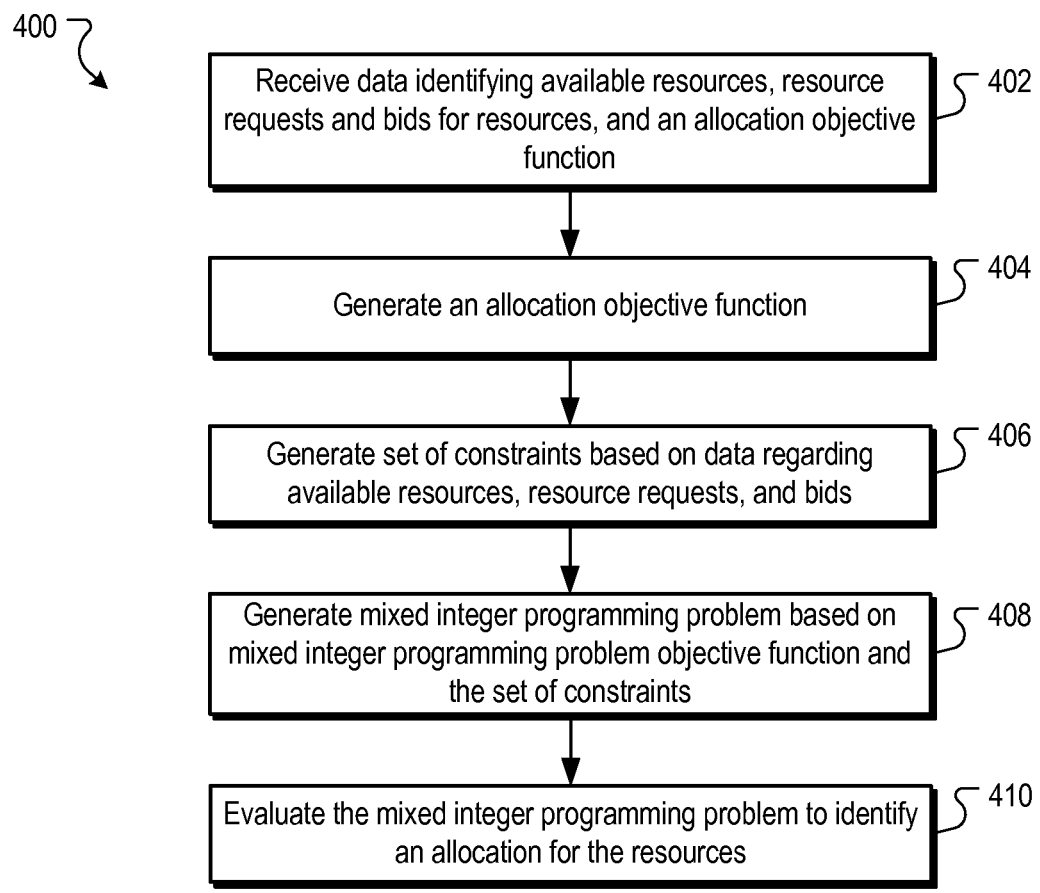
FIG. 4 is a flow chart of another example process for allocating resources.

FIG. 4 is a flow chart of another example process 400 for allocating resources. Operations of the process 400 can be implemented, for example, by a data processing apparatus, such as the resource allocation system 120 of FIG. 1. The process 400 can also be implemented by instructions stored on computer storage medium, where execution of the instructions by a data processing apparatus cause the data processing apparatus to perform the operations of the process 400.

Data identifying available resources, resource requests, and an objective function are received (402). For example, the resource allocation system 120 can receive this data from resource providers 104, resource requesters 110, and an operator (or other entity), respectively, as described above with reference to FIG. 3. For each request for a service, data identifying underlying resources and a resource bid for each underlying resource can also be received. As described above with reference to FIG. 3, each resource bid can also include one or more condition statements that condition the resource bid on one or more other resource bids.

The resource allocation system 120 generates an allocation objective function that specifies the objective and that includes variables that can be adjusted to achieve the objective based on the received data (404). The objective function may include variables for bid values, time periods, and resource quantities that can each be varied based on data specified in the resource statements and the request statements. For example, the bid values for a resource may be varied based on bid values specified in resource requests for that resource. In addition, the bid values may be varied based on bid values specified by resource bids for the resource generated from bids for computing services.

An example objective function for maximizing revenue for example resources "R1" and "R2" is shown in Objective Function (1) below, where "B1" is the amount that would be paid if the corresponding bid for "R1" wholly wins and "B2" is the amount that would be paid if the corresponding bid for "R2" wholly wins:

$$\text{Objective Function:Maximize } B1+B2 \quad (1)$$

In this example objective function, the winning bids are the highest bids for the two resources. The objective function may be much more complex than that presented above in Objective Function (1). For example, when resources can be split into multiple units (e.g., 1000 GB split into two sets of 500 GB) and split over multiple time periods, the objective function can specify multiple different objectives to be achieved, and the objectives may vary over time.

A set of constraints is generated based on the received data (406). The resource allocation system 120 can generate the set of constraints based on the data specified in the resource statements and the request statements. A subset of constraints can be generated for each available computing service and resource. For example, constraints for a particular available resource may include a time period in which the resource will be available, a maximum quantity of the resource available, and a minimum acceptable bid for the resource.

A subset of constraints can be generated for each bid for a resource, including the resource bids generated for resource based on each computing service. For example, the constraints for a bid for a resource can include a maximum bid value, a time period for which the resource is requested, a minimum and/or maximum quantity of the resource requested, interdependent conditions (e.g., only valid of another resource is allocated to the requester), and any geographic preferences for the resource. Another constraint is a budget for a resource requester 110. For example, if the resource requester specified a total budget that is not to be exceeded, the resource allocation system 120 may generate a constraint that prevents this budget from being exceeded.

A subset of constraints can also be generated for a resource provider 104. For example, a resource provider may specify a minimum total price for a set of computing services and/or resources that the resource provider is making available. The resource allocation system 120 can generate a constraint that specifies that the set of computing services and resources not be allocated unless the minimum total price is achieved.

The resource allocation system 120 generates a mixed integer programming problem based on the allocation objective function and the set of constraints (408). For example, the mixed integer programming problem may include the allocation objective function, variable values that can be entered into the allocation objective function (e.g., bid values, time periods, quantities, etc.) and the set of constraints.

The resource allocation system 120 evaluates the problem to identify an allocation of the resources that achieves the allocation objective and meets the constraints specified by the problem (410). To evaluate the problem, the resource allocation system 120 may substitute particular values for each variable, such as bid values for bids, into the objective function and determine which combination of bids provides a solution that meets the allocation objective within the confines of the constraints. For example, the resource allocation system 120 may evaluate many different combinations of bids for the available resources and different quantities for each bid (e.g., if the bid has an associated quantity range) and determine which of the combinations meets the allocation objective.

In some implementations, the resource allocation system 120 can iteratively create candidate resource allocations. After an iteration, each resource requester 110 may be given the opportunity to adjust their bid or conditions associated with the bid. For example, the resource allocation system 120 may inform each resource requester 110 of their candidate allocation at the end of the iteration. If the resource requester 110 was not allocated a desired resource, the resource requester 110 may increase the bid for the resource, increase their total budget, and/or relax any conditions placed upon the bid, such as a condition that another resource is allocated to the resource requester. After receiving the adjusted bids, the resource allocation system 120 can update the mixed integer programming problem and evaluate the updated problem to create a new candidate resource allocation.

In some implementations, the resource allocation system 120 can provide data to the resource requesters 110 that may help the requesters adjust their bids after an iteration, or after the completion of an auction. For example, the resource allocation system 120 may provide data that specify a suggested bid having a value that is likely to win allocation of a resource in the next iteration or in a subsequent auction. This suggested bid value may be determined based on the current winning bid value and/or data regarding past winning bids. In a multi-iteration auction, the resource requester can provide an updated bid for the computing resource that has a value that is based on the suggested bid. For example, the resource requester may increase its bid for the resource to the suggested bid value.

Figure 5:
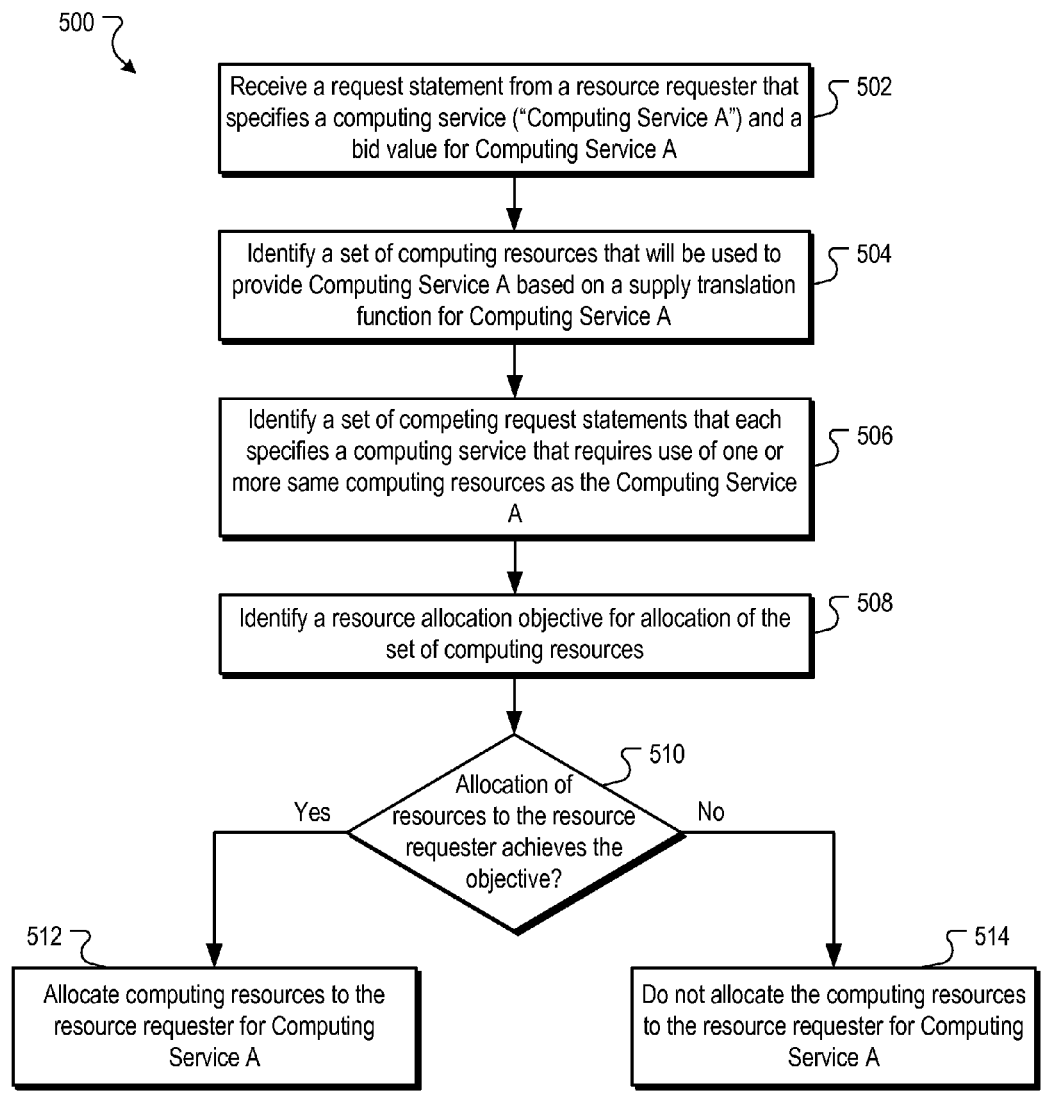
FIG. 5 is a flow chart of another example process for allocating resources.

FIG. 5 is a flow chart of another example process 500 for allocating resources. Operations of the process 500 can be implemented, for example, by a data processing apparatus, such as the resource allocation system 120 of FIG. 1. The process 500 can also be implemented by instructions stored on computer storage medium, where execution of the instructions by a data processing apparatus cause the data processing apparatus to perform the operations of the process 500.

A request statement 113 is received from a resource requester 110 (502). For example, the resource requester 110 may generate and provide the request statement 113 to the resource allocation system 120. The received request statement 113 specifies a computing service ("Computing Service A") and a service bid for Computing Service A. The service bid specifies a bid value that the resource requester 110 is willing to pay for Service A.

A set of available computing services and resources that will be used to provide Computing Service A is identified (504). The resource allocation system 120 can identify underlying computing services and resources for Computing Service A using a supply translation function for Computing Service A. The supply translation function specifies one or more computing services and one or more computing resources that are used to provide Computing Service A. For example, the supply translation function may specify that a backup service and a particular number of networking devices are demanded for Computing Service A.

The resource allocation system 120 can identify available computing services and resources that match those demanded by Computing Service A. Continuing the previous example, the resource allocation system 120 can identify a backup service and networking devices that can be used to provide Computing Service A. The resource allocation system 120 may also identify resources that can be used to provide the backup service, such as data storage units. These computing resources are resources for which a resource bid may be generated for Computing Service A.

A set of competing request statements are identified (506). Each competing request statement is a request statement that is competing for at least one of the underlying resources that have been identified for Computing Service A. The competing request statements can each specify a computing service and a bid for the computing service. The resource allocation system 120 can identify the competing request statements by identifying that the computing service specified by the competing request statement demands use of the same type of resource as Computing Service A. For example, a competing request statement may demand use of a networking device that has been identified for Computing Service A.

A competing request statement may be identified based on the computing service of the competing request statement demanding use of a proper subset of the computing resources demanded by Computing Service A. Continuing the previous example, the computing service of the competing request statement may demand use of a particular number of the same network resources, but less than the number of networking resources demanded by Computing Service A.

One or more of the competing request statements may specify a computing service that is on a different hierarchical level than Computing Service A. For example, a competing request statement may specify a sophisticated and highly secure Internet application that requires redundant processors and data storage units in many different geographic locations. Similarly, one or more of the competing request statements may be a resource level request statements that specifies a raw computing resource, such as a networking device.

A resource allocation objective is identified (508). The resource allocation objective specifies an objective to be met by allocating a set of available resources, including the set of computing resources identified for Computing Service A. For example, the resource allocation objective may be to maximize revenue or profits, or to minimize the number of rejected bids. The resource allocation objective may be identified from a data store.

A determination is made whether allocation of the computing resources identified for Computing Service A meets the resource allocation objective (510). For example, the resource allocation system 120 can make the determination based on the service bid for Computing Service A and the competing bids.

In some implementations, the resource allocation system 120 determines a resource bid for each underlying resource identified for Computing Service A based on the service bid and other data, such as a supply translation function for Computing Service A, a pricing function for Computing Service A, a supply translation function for the backup service, and/or a pricing function for the backup service. Similarly, the resource allocation system 120 may determine competing resource bids for each underlying resource of each competing resource statement, for example using a supply translation function or pricing function for the computing service specified by the competing request statements.

The resource allocation system 120 can determine whether allocating the computing resources for Computing Service A meets the resource allocation objective by generating a mixed integer programming problem using the resource allocation objective, the resource bids for Computing Service A, the competing resource bids, and other constraints, such as condition statements for one or more of the resource bids and competing resource bids. For example, the resource allocation system 120 may generate condition statements for the resource bids and competing resource bids as described above with reference to FIG. 3.

The resource allocation system 120 can evaluate the mixed integer programming problem to identify a resource allocation that meets the resource allocation objective. If this resource allocation includes allocating the resources for Computing Service A, then the resource allocation system 120 may determine that allocation of the resources for Computing Service A meets the resource allocation objective. Otherwise, if the resources are not allocated for Computing Service A, then the resource allocation system 120 may determine that allocation of the resources for Computing Service A does not meet the resource allocation objective.

If the resource allocation system 120 determines that the allocation of the resources for Computing Service A meets the resource allocation objective, the resource allocation system 120 may allocate the resources to the resource requester 110 so that the resource requester can utilize the requested Computing Service A (512). If the resource allocation system 120 determines that the allocation of the resources for Computing Service A does not meet the resource allocation objective, the resource allocation system 120 may not allocate the resources to the resource requester 110 (514). Thus, the resource requester 110 may not be able to utilize Computing Service A.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, from a first resource requester, a first request statement that specifies a first computing service and a service bid specifying a value that the first resource requester is willing to pay for the first computing service;
   identifying a first set of computing resources that will be used to provide the first computing service;
   determining, for each particular computing resource of the first set of computing resources, a first resource level bid value;
   identifying a competing request statement that specifies a second computing service and a competing bid specifying a value that a second resource requester that submitted the competing request statement is willing to pay for the second computing service, the competing request statement being identified based on the competing request statement's second computing service requiring a proper subset of the first set of computing resources, the second computing service being at a different level within a request hierarchy than the first computing service;
   determining, for the competing request statement, a second resource level bid value for each computing resource of the proper subset of computing resources using the competing bid;
   identifying a resource allocation objective for allocation of the first set of computing resources among the resource requesters;
   determining that allocation of the first set of computing resources to the first resource requester meets the resource allocation objective based, at least in part, on the first resource level bid value for each computing resource of the proper subset of computing resources and each second resource level bid value for each computing resource of the proper subset of computing resources; and
   in response to determining that allocation of the first set of computing resources to the first resource requester meets the resource allocation objective, providing data that causes the first set of computing resources to be allocated for use by the first resource requester.

2. The method of claim 1, wherein the competing request statement comprises a resource level request statement that specifies a given computing resource in the first set of computing resources and a competing bid for the given computing resource.

3. The method of claim 1, further comprising generating, for each particular computing resource of the first set of computing resources, a condition statement that conditions the first resource level bid value for the particular computing resource on a bid for another computing resource of the first set of computing resources.

4. The method of claim 1, wherein identifying the competing request statement comprises:
   receiving the competing request statement specifying the second computing service;
   identifying a second set of computing resources for use in providing the second computing service using a supply translation function for the second computing service, the supply translation function specifying one or more resources required to implement the second computing service; and
   determining that a computing resource of the second set of computing resources matches a computing resource of the first set of computing resources.

5. The method of claim 1, wherein:
   the first request statement specifies a quantity of the first computing service;
   a supply translation function that specifies a quantity of each of one or more computing resources used to provide an instance of the first computing service;
   a quantity of each of the one or more computing resources is determined for the first request statement based on the quantity of the first computing service specified by the first request statement and the quantity of the computing resource used to provide an instance of the first computing service specified by the supply translation function; and
   identifying the first set of computing resources for use in providing the first computing service comprises identifying, for each of the one or more computing resources, a set of available resources that correspond to the computing resource, the set of available resources including at least the required quantity of the computing resource.

6. The method of claim 1, further comprising determining the first resource level bid value for each computing resource of the first set of computing resources based on the service bid for the first computing service and a supply translation function specifying a quantity of each of one or more computing resources used to provide an instance of the first computing service.

7. The method of claim 1, wherein determining that allocation of the first set of computing resources to the first resource requester meets the resource allocation objective includes inputting the first request statement and the competing request statement into a mixed integer programming problem that allocates available computing resources to resource requesters based on the resource allocation objective and request statements including the first request statement and the competing request statement.

8. The method of claim 1, wherein the resource allocation objective includes one of maximizing revenue from the bid values, minimizing a number of rejected request statements, or maximizing a number of resources allocated.

9. The method of claim 1, wherein identifying a first set of computing resources that will be used to provide the first computing service comprises identifying the first set of computing resources based on a first supply translation function specifying one or more computing resources that are used to provide the first computing service.

10. The method of claim 9, wherein the one or more resources specified by the first supply translation function are raw computing resources required to implement the first computing service.

11. The method of claim 1, wherein determining a first resource level bid value for a particular computing resource comprises determining the first resource level bid based on the service bid and a first pricing function that converts the service bid to the first resource level bid.

12. A system, comprising:
a data store for storing request statements received from resource requesters and resource allocation objectives; and
one or more processors configured to interact with the data store, the one or more processors being further configured to perform operations comprising:
receiving, from a first resource requester, a first request statement that specifies a first computing service and a service bid specifying a value that the first resource requester is willing to pay for the first computing service;
identifying a first set of computing resources that will be used to provide the first computing service;
determining, for each particular computing resource of the first set of computing resources, a first resource level bid value;
identifying a competing request statement that specifies a second computing service and a competing bid specifying a value that a second resource requester that submitted the competing request statement is willing to pay for the second computing service, the competing request statement being identified based on the competing request statement's second computing service requiring a proper subset of the first set of computing resources, the second computing service being at a different level within a request hierarchy than the first computing service;
determining, for the competing request statement, a second resource level bid value for each computing resource of the proper subset of computing resources using the competing bid;
identifying, from the data store, a resource allocation objective for allocation of the first set of computing resources among the resource requesters;
determining that allocation of the first set of computing resources to the first resource requester meets the resource allocation objective based, at least in part, on the first resource level bid value for each computing resource of the proper subset of computing resources and each second resource level bid value for each computing resource of the proper subset of computing resources; and
in response to determining that allocation of the first set of computing resources to the first resource requester meets the resource allocation objective, providing data that causes the first set of computing resources to be allocated for use by the first resource requester.

13. The system of claim 12, wherein the competing request statement comprises a resource level request statement that specifies a given computing resource in the first set of computing resources and a competing bid for the given computing resource.

14. The system of claim 12, wherein the one or more processors are further configured to generate, for each particular computing resource of the first set of computing resources, a condition statement that conditions the first resource level bid value for the particular computing resource on a bid for another computing resource of the first set of computing resources.

15. The system of claim 12, wherein identifying the competing request statement comprises:
receiving the competing request statement specifying the second computing service;
identifying a second set of computing resources for use in providing the second computing service using a supply translation function for the second computing service, the supply translation function specifying one or more resources required to implement the second computing service; and
determining that a computing resource of the second set of computing resources matches a computing resource of the first set of computing resources.

16. The system of claim 12, wherein:
the first request statement specifies a quantity of the first computing service;
a supply translation function that specifies a quantity of each of one or more computing resources used to provide an instance of the first computing service;
a quantity of each of the one or more computing resources is determined for the first request statement based on the quantity of the first computing service specified by the first request statement and the quantity of the computing resource used to provide an instance of the first computing service specified by the supply translation function; and
identifying the first set of computing resources for use in implementing providing the first computing service comprises identifying, for each of the one or more computing resources, a set of available resources that correspond to the computing resource, the set of available resources including at least the required quantity of the computing resource.

17. The system of claim 12, wherein the one or more processors are further configured to determine the first resource level bid value for each computing resource of the first set of computing resources based on the service bid for the first computing service and a supply translation function specifying a quantity of each of one or more computing resources used to provide an instance of the first computing service.

18. The system of claim 12, wherein determining that allocation of the first set of computing resources to the first resource requester meets the resource allocation objective includes inputting the first request statement and the competing request statement into a mixed integer programming problem that allocates available computing resources to resource requesters based on the resource allocation objective and request statements including the first request statement and the competing request statement.

19. The system of claim 12, wherein the resource allocation objective includes one of maximizing revenue from the bid values, minimizing a number of rejected request statements, or maximizing a number of resources allocated.

20. The system of claim 12, wherein identifying a first set of computing resources that will be used to provide the first computing service comprises identifying the first set of computing resources based on a first supply translation function specifying one or more computing resources that are used to provide the first computing service.

21. The system of claim 20, wherein the one or more resources specified by the first supply translation function are raw computing resources required to implement the first computing service.

22. The system of claim 12, wherein determining a first resource level bid value for a particular computing resource comprises determining the first resource level bid based on the service bid and a first pricing function that converts the service bid to the first resource level bid.

23. A non-transitory computer storage medium encoded with a computer program, the program comprising instructions that when executed by data processing apparatus cause the data processing apparatus to perform operations comprising:
    receiving, from a first resource requester, a first request statement that specifies a first computing service and a service bid specifying a value that the first resource requester is willing to pay for the first computing service;
    identifying a first set of computing resources that will be used to provide the first computing service;
    determining, for each particular computing resource of the first set of computing resources, a first resource level bid value;
    identifying a competing request statement that specifies a second computing service and a competing bid specifying a value that a second resource requester that submitted the competing request statement is willing to pay for the second computing service, the competing request statement being identified based on the competing request statement's second computing service requiring a proper subset of the first set of computing resources, the second computing service being at a different level within a request hierarchy than the first computing service;
    determining, for the competing request statement, a second resource level bid value for each computing resource of the proper subset of computing resources using the competing bid;
    identifying a resource allocation objective for allocation of the first set of computing resources among the resource requesters;
    determining that allocation of the first set of computing resources to the first resource requester meets the resource allocation objective based, at least in part, on the first resource level bid value for each computing resource of the proper subset of computing resources and each second resource level bid value for each computing resource of the proper subset of computing resources; and
    in response to determining that allocation of the first set of computing resources to the first resource requester meets the resource allocation objective, providing data that causes the first set of computing resources to be allocated for use by the first resource requester.

24. The non-transitory computer storage medium of claim 23, wherein the competing request statement comprises a resource level request statement that specifies a given computing resource in the first set of computing resources and a competing bid for the given computing resource.

25. The non-transitory computer storage medium of claim 23, wherein the instructions when executed cause the data processing apparatus to perform further operations comprising generating, for each particular computing resource of the first set of computing resources, a condition statement that conditions the first resource level bid value for the particular computing resource on a bid for another computing resource of the first set of computing resources.

26. The non-transitory computer storage medium of claim 23, wherein identifying the competing request statement comprises:
    receiving the competing request statement specifying the second computing service;
    identifying a second set of computing resources for use in providing the second computing service using a supply translation function for the second computing service, the supply translation function specifying one or more resources required to implement the second computing service; and
    determining that a computing resource of the second set of computing resources matches a computing resource of the first set of computing resources.

27. The non-transitory computer storage medium of claim 23, wherein:
    the first request statement specifies a quantity of the first computing service;
    a supply translation function that specifies a quantity of each of one or more computing resources used to provide an instance of the first computing service;
    a quantity of each of the one or more computing resources is determined for the first request statement based on the quantity of the first computing service specified by the first request statement and the quantity of the computing resource used to provide an instance of the first computing service specified by the supply translation function; and
    identifying the first set of computing resources for use in providing the first computing service comprises identifying, for each of the one or more computing resources, a set of available resources that correspond to the computing resource, the set of available resources including at least the required quantity of the computing resource.

28. The non-transitory computer storage medium of claim 23, wherein the instructions when executed cause the data processing apparatus to perform further operations comprising determining the first resource level bid value for each computing resource of the first set of computing resources based on the service bid for the first computing service and a supply translation function specifying a quantity of each of one or more computing resources used to provide an instance of the first computing service.

29. The non-transitory computer storage medium of claim 23, wherein determining that allocation of the first set of computing resources to the first resource requester meets the resource allocation objective includes inputting the first request statement and the competing request statement into a mixed integer programming problem that allocates available computing resources to resource requesters based on the resource allocation objective and request statements including the first request statement and the competing request statement.

30. The non-transitory computer storage medium of claim 23, wherein the resource allocation objective includes one of maximizing revenue from the bid values, minimizing a number of rejected request statements, or maximizing a number of resources allocated.

31. The non-transitory computer storage medium of claim 23, wherein identifying a first set of computing resources that will be used to provide the first computing service comprises identifying the first set of computing resources based on a first supply translation function specifying one or more computing resources that are used to provide the first computing service.

32. The non-transitory computer storage medium of claim 31, wherein the one or more resources specified by the first supply translation function are raw computing resources required to implement the first computing service.

33. The non-transitory computer storage medium of claim 23, wherein determining a first resource level bid value for a particular computing resource comprises determining the first resource level bid based on the service bid and a first pricing function that converts the service bid to the first resource level bid.

* * * * *